J. A. ASPINWALL & C. M. PERRY,

Assignors, by mesne assignments, to G. S. SHEFFIELD & Co.

Velocipede.

No. 9,348. Reissued Aug. 24, 1880.

WITNESSES

E. D. Nottingham

A. M. Bright

INVENTOR

J. A. Aspinwall.

C. M. Perry.

By W. W. Leggett, ATTORNEY

N. PETERS, PHOTO-LITHOGRAPHER, WASHINGTON, D. C.

UNITED STATES PATENT OFFICE.

JOHN A. ASPINWALL AND CHARLES M. PERRY, OF NEW UTRECHT, N. Y., ASSIGNORS, BY MESNE ASSIGNMENTS, TO GEORGE S. SHEFFIELD & CO.

VELOCIPEDE.

SPECIFICATION forming part of Reissued Letters Patent No. 9,348, dated August 24, 1880.

Original No. 93,159, dated August 3, 1869. Application for reissue filed April 29, 1880.

*To all whom it may concern:*

Be it known that we, JOHN ABEL ASPINWALL and CHARLES MONTAGUE PERRY, of New Utrecht, in the county of Kings and State of New York, have made an invention of certain new and useful Improvements in Velocipedes; and we do hereby declare that the following is a full, clear, and exact description and specification of our said invention.

The object of our invention is to enable velocipedes to be run with facility along the rail of an ordinary street railroad.

To this end our invention consists of the combination of the frame of the velocipede with a supplementary wheel connected with said frame by means of an arm in such manner that while the running wheels of the velocipede traverse one rail of a street-railway the supplementary wheel traverses the other rail thereof and guides and steadies the velocipede.

Our invention consists, further, in the combination of the wheel and arm so constructed that they can be readily attached to or detached from the frame of a velocipede, the wheel and arm thus constructed and combined constituting a velocipede attachment that can be manufactured separately from velocipedes and sold to those who use them, so as to enable velocipedes to which such attachments are applied to be run with facility and great speed along street-railways.

In order that our invention may be fully understood, we have represented in the accompanying drawings, and will proceed to describe, a velocipede embodying it—

Figure 2:
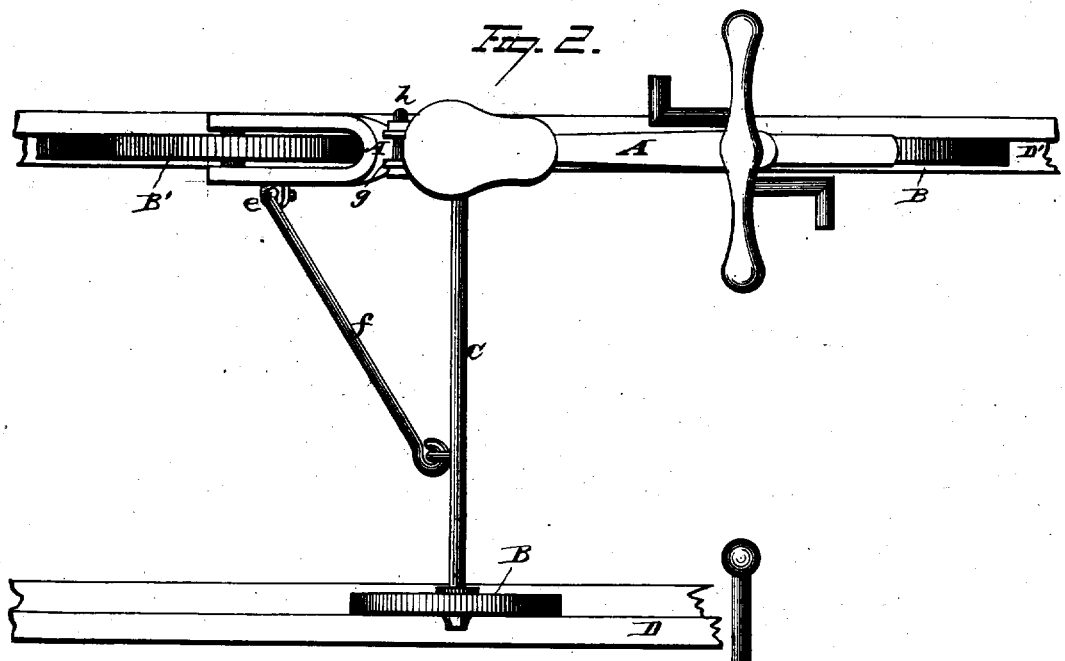
Figure 1:
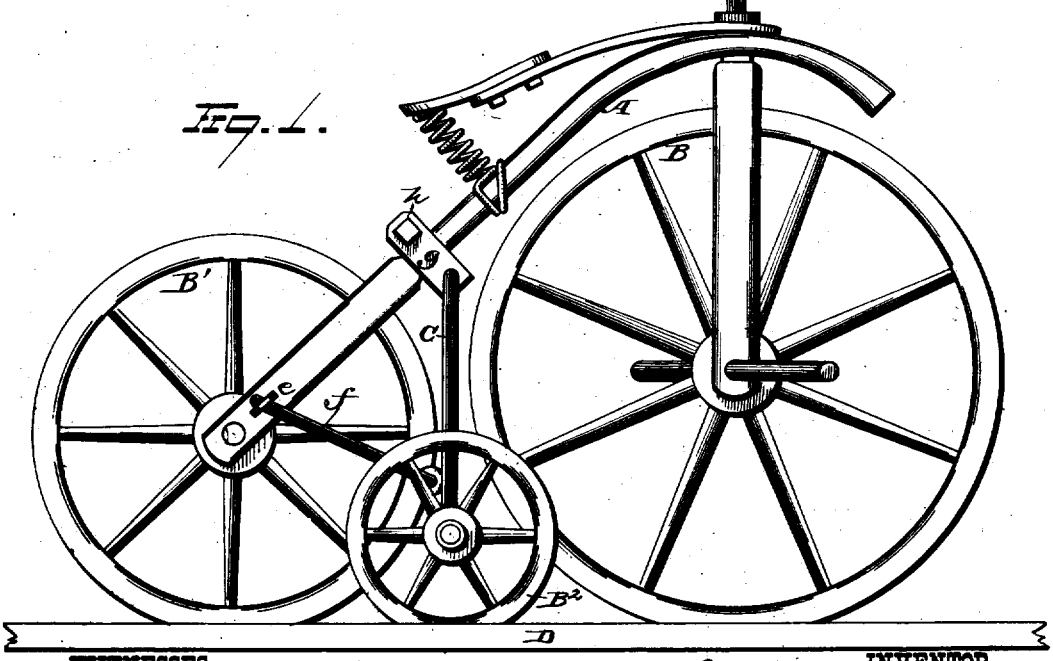

Figure 1 representing a side view of the velocipede, and Fig. 2 representing a horizontal plan of it.

The frame A of the velocipede, the two running wheels B B′, and the connections and appurtenances of the wheels and frame may be the same as the corresponding parts of the two-wheeled velocipedes in common use.

The supplementary wheel $B^2$ is made, by preference, of smaller diameter than the ordinary running wheels B B′, and is applied to a journal at the outer end of an arm, C, which holds the supplementary wheel at the proper distance from the running wheels B B′ to enable the supplementary wheel to traverse one rail, D, of the track of a street-railroad while the running wheels B B′ traverse the other rail, D′.

The arm C is so connected with the frame A as to extend rigidly from its side. The mode in which we prefer to secure this rigidity is by means of a diagonal brace, *f*.

The wheel-arm C is constructed, by preference, with a clip, *g*, at its end, which embraces the frame A of the velocipede, and is secured thereto by a screw-bolt, *h*.

The diagonal brace *f* may be constructed in the same manner, or may have its end hook-formed, to hook into an eye, *e*, which is connected with the frame A of the velocipede.

The latter mode of constructing the brace is preferable, because it permits the supplementary wheel and its appurtenances to be more quickly attached to and detached from the velocipede, as but one bolt, *h*, has to be operated for the purpose.

The supplementary wheel $B^2$ and its arm C, with their appurtenances, thus constitute what may be termed a "velocipede attachment," which may be manufactured separately from velocipedes and sold to those who use them; and the construction of this attachment may be greatly varied without ceasing to embody our invention so long as it consists, essentially, of a supplementary wheel and an arm suitable to be secured to the side of a velocipede, so as to operate in the manner before described.

The invention we have described enables a velocipede to be run with great speed and steadiness along an ordinary street-railway, a speed of from twelve to fifteen miles per hour being readily attainable by an expert operator.

Moreover, the invention does not unfit the velocipede for running on ordinary roads, as the attachment may be quickly detached and then carried by the rider.

In turning out from a railroad, all that is necessary is to rock the velocipede slightly, so as to lift the supplementary wheel from the rail, whereupon the velocipede can be turned in the ordinary way, and afterward the supplementary wheel may be again dropped to the ground.

Having thus described the modes in which we propose to apply the principle of our invention, we declare that we do not claim, broadly, the employment of three wheels in a velocipede, as we are aware that velocipedes have been constructed with three wheels, one in front and two behind; but in such cases neither of the hind wheels ran in the track of the leading wheel, and the vehicle was consequently not adapted to run upon the rail of a railway.

We are aware that guiding-wheels have been applied to carriages and cars for the purpose of causing the wheels to traverse railway-tracks, the guiding-wheels in such cases being applied in the vicinity of the wheels they are intended to guide, so as to perform the function of flanges. We therefore do not claim, broadly, a guiding-wheel, nor the application of a guiding-wheel to carriages of every description.

What we claim as our invention, and desire to secure by Letters Patent, is—

1. A propeller for railways, consisting of a multiple-wheeled truck adapted to run upon one line of rails, a supplementary wheel adapted to run upon the other line, with an arm to support the same, and crank mechanism whereby the device may be propelled by a person upon the vehicle, substantially as described.

2. The combination of the frame of a velocipede with a supplementary wheel and an arm sustaining said wheel at one side of said frame, so as to run upon one rail of a railway-track while the running wheels of the velocipede run upon the other rail, substantially as before set forth.

3. The combination of the supplementary wheel and arm, constituting a velocipede attachment, suitable to be applied to and to operate in connection with a velocipede, as before set forth.

J. A. ASPINWALL.
CHAS. M. PERRY.

Witnesses:
JOHN HOWARD LATHAM,
J. H. NORTHERMAN.